Oct. 6, 1953

J. C. WEIDEL 2,654,413

EXPANSIBLE MANDREL

Filed March 24, 1951

2 Sheets-Sheet 1

J. C. WEIDEL
INVENTOR.

BY Everett N. Curtis
ATTORNEY

Oct. 6, 1953

J. C. WEIDEL 2,654,413

EXPANSIBLE MANDREL

Filed March 24, 1951

2 Sheets-Sheet 2

J. C. WEIDEL
INVENTOR.

BY
ATTORNEY

Patented Oct. 6, 1953

2,654,413

UNITED STATES PATENT OFFICE 2,654,413

EXPANSIBLE MANDREL

Joseph C. Weidel, Bonita, Calif., assignor to Rohr Aircraft Corporation, Chula Vista, Calif., a corporation of California Application March 24, 1951, Serial No. 217,349

3 Claims. (Cl. 153—80)

This invention relates to an expansible mandrel adapted to alter the size and/or shape of open ended tubular articles such as sheet metal cylinders, sleeves, collars, rings, etc.

In the manufacture of such articles, close tolerances must frequently be held, as for example, in the inner or outer diameter of a cylindrical sleeve. The general requirement of low tooling costs, in many cases prohibits the holding of such tolerances when the article is initially formed, since the development costs of forming equipment are in direct proportion to the degree of precision it is required to have. Consequently, it is common practice to form such an article relatively crudely in the initial operation, resorting to a secondary operation to bring it into its finished shape and size.

It is also well known, that in the case of welded tubular articles, the metal temperatures produced by the welding operation tend to distort the article, necessitating a final truing operation, where any appreciable accuracy is required.

The principal object of this invention is to fulfill the needs arising from the problems above described.

Another object is to provide an expansible mandrel which is capable of increasing the diameter of tubular articles within certain limits.

A further object is to provide a device of this class having associated adjustment means which may be easily and quickly controlled by the operator.

A still further object is to provide a device of this class which will not score or otherwise mar the surface of the workpiece.

Other objects will appear in the description as hereinafter more fully set forth.

Figure 1:
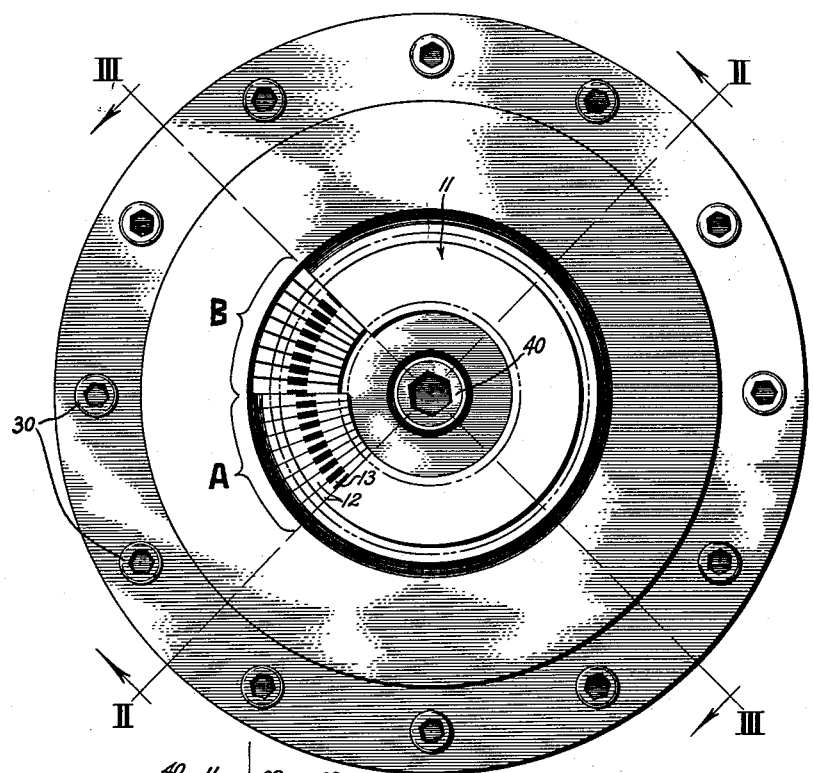
Figure 2:
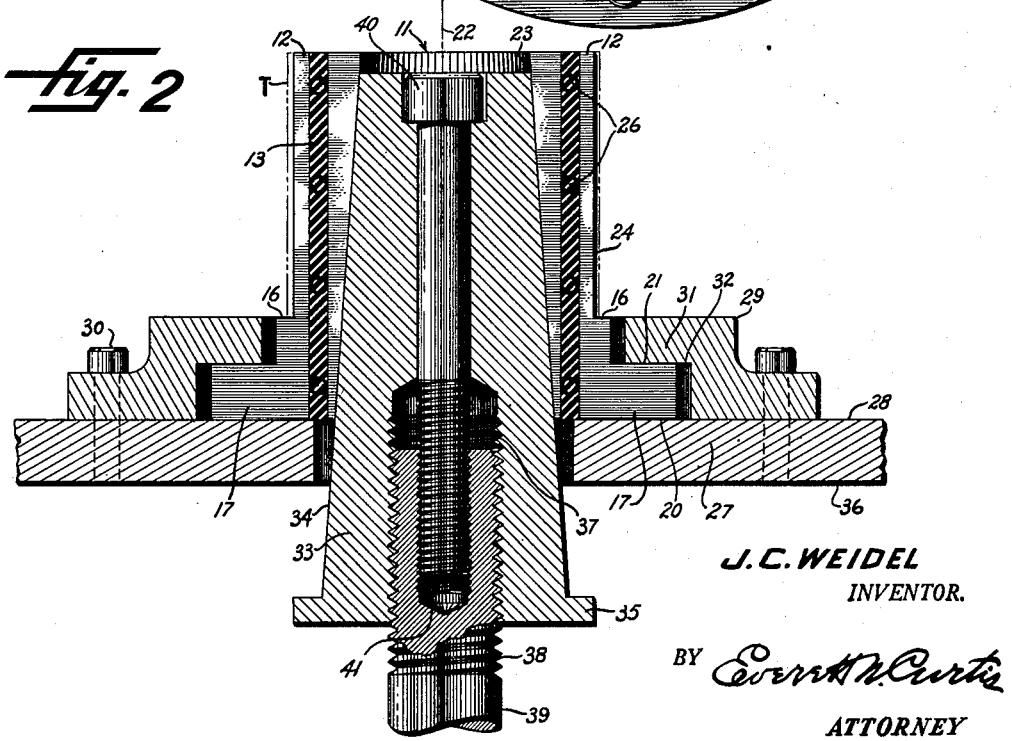
Figure 3:
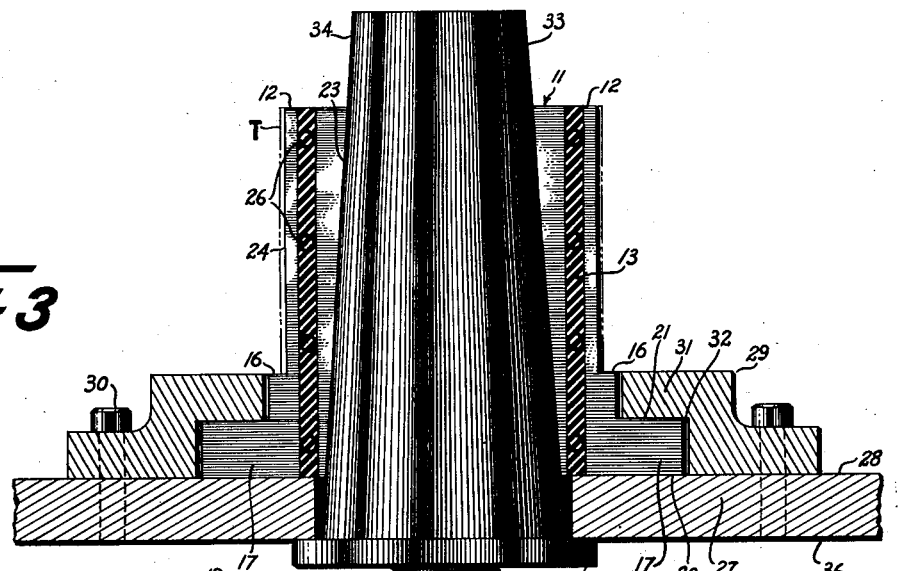
Figure 4:
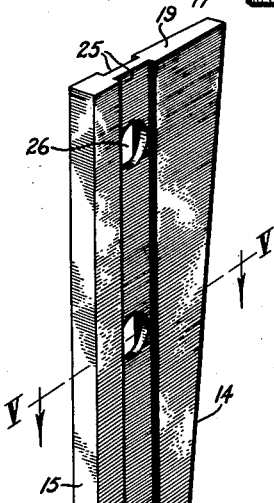
Figure 5:
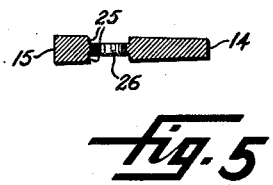

For a better understanding of the invention, reference is made to the accompanying drawings in which:

Figure 1 is a plan view of a mandrel embodying the invention, showing the major portion thereof in its unexpanded position and the remainder in its expanded position, Figure 2 is a vertical section of Figure 1 taken along the line II—II showing the mandrel in its unexpanded position, Figure 3 is a vertical section taken along the line III—III of Figure 1 showing the mandrel in its expanded position, Figure 4 is a perspective view of one of the metal blades of the mandrel and, Figure 5 is a cross section of Figure 4 taken along the line V—V.

The mandrel 11 comprises a ring of generally sector-shaped steel blades 12 which are held together in assembled relationship by a body 13 composed of rubber, Neoprene, the polychloroprene having the molecular composition $C_4H_5Cl$ or other known elastic material which is resilient and assumes its original shape upon the removal of a force which has deformed it. Each blade is shaped as shown in Figures 4 and 5, having a tapered inner edge 14 and a vertical tube-engaging edge 15 which terminates below in a step 16. Projecting outwardly beyond step 16, the lower end of the blade has a guide foot 17 terminating in a vertical edge 18. The top edge 19 and bottom edge 20 of the blade are horizontal and parallel to the top edge 21 of foot 17. The material of the blade increases in thickness from its inner edge 14 to its outer edge 18 so that when a set of the blades is arranged around a central axis 22 (Figure 2), the edges 14 together form a conically shaped surface 23 and the edges 15 together form a cylindrical surface 24.

Each blade has a pair of grooves 25 cut in its opposite faces and a series of spaced apart holes 26 connecting these grooves. In the assembly of the mandrel the resilient material enters these grooves and holes and becomes firmly bonded to the blades during the vulcanization or bonding process for the resilient material. Since the resilient material in holes 26 connects the vertical strips of similar material located in the grooves 25 together, a continuous ring of the resilient material is provided within the mandrel to connect the blades thereof and maintain them in symmetrically assembled relationship while permitting the slight separation of the blades incident to the expansion of the mandrel.

The mandrel is mounted on a horizontal table 27, the upper surface 28 of which is smooth to permit the sliding engagement of the bottom faces 20 of blades 12.

Operation of the mandrel is effected by a plunger 33, the upward thrust of which is taken up by a retaining ring 29 secured to the table 27 by a set of bolts 30. Ring 29 has an inwardly extending flange 31, the lower surface 32 of which is smooth to permit sliding engagement with the top faces 21 of the feet 17.

The conically shaped surface 34 of the plunger 33 has the same taper as the edges 14 of blades 12, and is adapted to bear against the conically shaped surface 23 formed by those edges. At its lower end the plunger has a projecting flange 35 adapted to abut against the bottom face 36 of table 27 and form a stop device to limit the upward movement of the plunger. Plunger 33 has a tapped hole 37 to receive the screw thread 38 formed on the end of a push rod 39, this construction providing for the easy adjustment of the plunger along the rod. The plunger 33 is locked in adjusted position by a lock bolt 40 threaded into a tapped hole 41 in the end of rod 39. Power may be applied to push rod 39 by any suitable means, for example, the rod may carry a piston (not shown) movable within a vertical cylinder to which fluid under pressure may be admitted to operate the piston in a well known manner. It will be understood, however, that any other reciprocating power member may be used to actuate rod 39.

To operate the mandrel, the tube T to be expanded is slipped over the mandrel 11 and lowered until its bottom edge rests upon the steps 16 which then support its weight. Push rod 39 is then caused to rise until the upper portion of conical-cam face 34 engages a portion of conical surface 23. If at this time the vertical axis 22 of mandrel 11 is not in alignment with the axis of cam face 34, a slight further rise of plunger 34 will apply pressure to several of the blades 12 at one side of the mandrel only. The sidewise component of this pressure causes the entire mandrel 11 to slide a small distance along the surface 28 of table 27 until the axis 22 of the mandrel comes into alignment with the axis of cam face 34. The mandrel in this position is shown in Figures 1 and 2, the blades 12 of Figure 2 and those shown in sector A of Figure 1 being represented in their innermost position before expansion of tube T has commenced. Still further rise of plunger 33 causes all the blades 12 to move radially outward and deform tube T into truly cylindrical shape if it was not cylindrical when placed on the mandrel. If the tube was cylindrical when placed on the mandrel, the expansion of the mandrel causes its deformation and an increase in its diameter. The rise of plunger 33 is continued until the expansion of the mandrel expands tube T to the desired diameter, the blades 12 separating slightly one from another during the expansion and the rubber 13 between the blades being placed under tension. When the flange 35 abuts against the bottom 36 of table 27, the rise of plunger 33 is arrested and the mandrel is in its fully expanded condition, as shown in Figure 3. Several blades 12 of the mandrel in this condition are shown in sector B of Figure 1.

Furthermore just as the rise of plunger 33 is stopped by flange 35, the hydraulic piston (not shown) attached to push rod 39 comes to the end of its stroke. Under these conditions the tube T has been expanded to the maximum diameter within the range of the mandrel. If a smaller diameter of tube is desired, the operator loosens lock bolt 40 and screws plunger 33 down on rod 39 by the proper amount, before expansion of the tube is commenced, and then tightens lock bolt 40. Upon again operating the mandrel, when the piston reaches the upper end of its stroke, plunger 33 will not rise so high and flange 35 will not reach the level of the bottom 36 of table 27. This is explained by the fact that the hydraulic cylinder (or other actuating means) remains at a fixed distance from the top of the table. By thus adjusting the position of plunger 33 on push rod 39, tubes can be expanded with precision to any desired diameter within the capacity of the mandrel.

Upon lowering plunger 33, the blades 12 are pulled inwardly by the rubber of body 13 which is under tension until the faces of adjacent blades are in contact with each other and the mandrel is in its initial condition. The finished tube T is no longer gripped by the blades and may be readily lifted from the mandrel.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

Having thus described my invention, what I claim as new and useful and desire to secure by Letters Patent is:

1. A hollow mandrel adapted to be expanded by the conical cam surface of a power-operated plunger, comprising: a plurality of radially disposed rigid blades, the opposite faces of each blade being in full contact with the faces of the adjacent blades, each of said faces being provided with a groove extending lengthwise the entire length of the face, the inner edges of said blades extending to form a conical surface adapted to be engaged by said cam surface and the outer edges of said blades forming a cylindrical surface adapted to engage the inner surface of a tube to be deformed; a body of resilient rubber-like material disposed between said blades extending into and filling said grooves and being attached to the walls thereof whereby said blades are yieldingly secured together.

2. A mandrel as claimed in claim 1; in which said blades are provided with spaced apart openings near the upper and lower edges thereof extending through said blades and opening into said grooves, said resilient rubber-like material passing through and filling said openings.

3. A hollow mandrel adapted to be expanded by the conical cam surface of a vertically movable power operated plunger comprising, in combination: a plurality of radially disposed rigid metal blades, the opposite faces of each blade being in full contact with the faces of the adjacent blades, each of said faces being provided with a groove extending lengthwise the entire length of the face, the inner edges of the blades extending to form a conical surface adapted to be engaged by said cam surface, each blade having a long vertical portion arranged to engage and expand the interior of a vertical tube, a first step projecting out from the lower end of said vertical portion and a second step projecting out from the lower end of said first step, said first steps forming a series of spaced apart supports adapted to engage the lower end of the tube at many regions and support the entire weight of the tube, the upper ends of said second steps lying in a horizontal plane; a body of resilient rubber-like material disposed between said blades, filling said grooves and being attached to the walls thereof whereby said blades are yieldingly secured together; an annular retaining ring having a smooth horizontal surface projecting in over said second steps and along which said second steps are slidable in response to the upward movement of the plunger, the top of said retaining ring being disposed out of the path of travel of the lower end of the tube as the tube is expanded; and means for securing said ring in a fixed horizontal position.

JOSEPH C. WEIDEL.

References Cited in the file of this patent

UNITED STATES PATENTS

| Number | Name | Date |
|---|---|---|
| 232,317 | Tully | Sept. 14, 1880 |
| 698,404 | Knapp | Apr. 22, 1902 |
| 907,396 | Passat | Dec. 22, 1908 |
| 1,412,326 | Williams | Apr. 11, 1922 |
| 1,528,560 | Myers | Mar. 3, 1925 |
| 1,589,541 | Miller | June 22, 1926 |
| 1,671,697 | Burke | May 29, 1928 |
| 1,793,749 | Rode | Feb. 24, 1931 |
| 1,925,850 | Spatta | Sept. 5, 1933 |
| 1,939,711 | Mason | Dec. 19, 1933 |
| 1,904,152 | Lovely | Apr. 18, 1933 |
| 2,134,475 | Green | Oct. 25, 1938 |
| 2,193,231 | Gibbons | Mar. 12, 1940 |
| 2,346,706 | Stoner | Apr. 18, 1944 |
| 2,345,091 | Brace | Mar. 28, 1944 |
| 2,350,410 | Murphy | June 6, 1944 |
| 2,461,565 | Morrill | Feb. 15, 1949 |
| 2,544,633 | Le Count | Mar. 6, 1951 |